June 15, 1954 J. E. CANDLIN, JR 2,681,016
VEHICLE ROOM ARRANGEMENT
Filed Oct. 15, 1951 7 Sheets-Sheet 1

June 15, 1954　　　J. E. CANDLIN, JR　　　2,681,016
VEHICLE ROOM ARRANGEMENT
Filed Oct. 15, 1951　　　　　　　　　　　　　7 Sheets-Sheet 2

June 15, 1954  J. E. CANDLIN, JR  2,681,016
VEHICLE ROOM ARRANGEMENT
Filed Oct. 15, 1951  7 Sheets-Sheet 4

Inventor:
James E. Candlin, Jr.
By Wayne Morris Russell
Atty.

June 15, 1954     J. E. CANDLIN, JR     2,681,016
VEHICLE ROOM ARRANGEMENT Filed Oct. 15, 1951     7 Sheets-Sheet 7

Inventor.
James E. Candlin, Jr.
By Wayne Morris / Russell
Atty.

Patented June 15, 1954

2,681,016

UNITED STATES PATENT OFFICE 2,681,016

VEHICLE ROOM ARRANGEMENT

James E. Candlin, Jr., Flossmoor, Ill., assignor to Pullman-Standard Car Manufacturing Company, Chicago, Ill., a corporation of Delaware Application October 15, 1951, Serial No. 251,408

23 Claims. (Cl. 105—315)

The present invention relates to a room arrangement for passenger vehicles, and more particularly to such an arrangement in which adjoining rooms may be disposed en suite and provided with an enclosed toilet annex. The invention further relates to a vehicle having a plurality of sleeping rooms in which a passageway along the rooms has alcoves from which the rooms are entered and from which storage compartments are accessible without blocking of the passageway, the alcoves partially defining the rooms to facilitate the provision of the annex.

In the embodiment disclosed, the alcoves of the passageway are so arranged that they provide in each room a relatively narrow part at the end adjacent the passageway, each alcove extending to either side of a partition between adjacent rooms and having divided therefrom a storage compartment providing a central linen locker or the like opening on the alcove and side lockers opening to the rooms. A door for each of the adjacent rooms opens on the alcove, which is of sufficient depth to allow a person to stand therein clear of the passageway. Between the rooms is a fixed partition extending to the compartment and alcove, and between each of the rooms so divided and the adjoining room on the opposite side thereof is a movable partition member suitably mounted on an overhead track so that it may be shifted to extend across the narrow end part of one of the rooms and close it off as an annex, the two rooms being at the same time thrown en suite. The movable partition does not extend to the room ceiling, and at about the level of the top of the partition is a plate-like member serving as a luggage shelf and extending over the narrow end part of the room to serve also as a ceiling for the annex, a portion of the track extending along the edge of this annex ceiling. In the partition member is a door which affords passage to and from the annex when the annex is provided, and which may be locked from both sides so that the rooms are not accessible to each other when the partition member is in the room-separating position. The partition has locking means at opposite ends for securing it in either of its positions. Each of the rooms may have toilet facilities, such as a hopper and washstand, in its narrow end part, the facilities of one of the rooms being enclosable in the annex.

By the invention, as evident from a consideration of the specific embodiment illustrated, means are provided not only for opening adjoining rooms of a sleeping car or the like to each other, but for providing an annex in the combined rooms simultaneously with their being placed en suite, so that desired privacy is attained without the loss of spaciousness which would result from the provision of a permanent annex. When the rooms are used as separate units, neither is restricted by such an annex, the need for which is much less than when the rooms are occupied as a combined unit, the single room itself in many if not most cases providing all the privacy required. The provision of a number of relatively small lockers for linen and other items required in a sleeping car makes a large storage locker unnecessary, permitting better utilization of space for passenger accommodations, as for more or larger accommodations, without appreciably reducing the space of the separate accommodations. Further, time and labor in preparing accommodations for either day or night use is saved by storing the needed items conveniently to the several accommodations. The provision of the alcoves results in a convenient construction of the room to cooperate with the movable partition member for providing the annex, and allows entry to or exit from the rooms and access to the storage space without impeding the passageway.

The advantages pointed out as accruing from the invention are not the only one obtainable, and are not limited to the specific structure and arrangement illustrated, but may be obtained by employing the principle in other arrangements and constructions. Similarly, the construction and arrangement may be varied to obtain only some of the advantages, if desired. The principle may be applied to other vehicles than railway sleeping cars, as for example house trailers, airplanes, and passenger ships.

It is an object of the present invention to provide a vehicle room arrangement in which movable and fixed partitions are employed to afford maximum space for accommodations and maximum flexibility, convenience, and privacy in utilization of the accommodations.

It is another object of the invention to provide a room arrangement in which a movable partition may alternatively separate adjoining rooms or arrange the rooms en suite while separating a part of one room therefrom as an annex.

Another object is the provision of a railway sleeping car room arrangement in which one of a pair of adjoining rooms has a narrow end portion, and a movable partition is mounted for shifting to extend either across the narrow end portion to provide an annex while arranging the rooms en suite or disposed to separate the rooms to provide individual accommodations.

Another object is the provision of a sleeping car room arrangement in which a plurality of rooms are disposed along a passageway having alcoves from which the room doors open to permit entry and exit without impeding the passageway, and movable partitions between adjoining rooms are mounted for shifting from room-separating position to a position placing a pair of adjoining rooms en suite and extending across a narrow part of one of the rooms defined therein by an alcove to provide an annex.

Still another object is the provision of a sleeping car room arrangement in which a plurality of rooms are disposed along a passageway having alcoves with storage compartments therein accessible from the alcoves and from which the room doors open for entry and exit, without impedance of the passageway.

Other and further objects, advantages, and features of the invention will be apparent to those skilled in the art from the following description together with the accompanying drawings, in which:

Fig. 2 is a vertical sectional view taken substantially as indicated by the line 2—2 of Fig. 1;

Fig. 3 is a transverse sectional view taken substantially as indicated by the line 3—3 of Fig. 1, with the movable partition member in the dotted line position of the latter figure.

Figure 1:
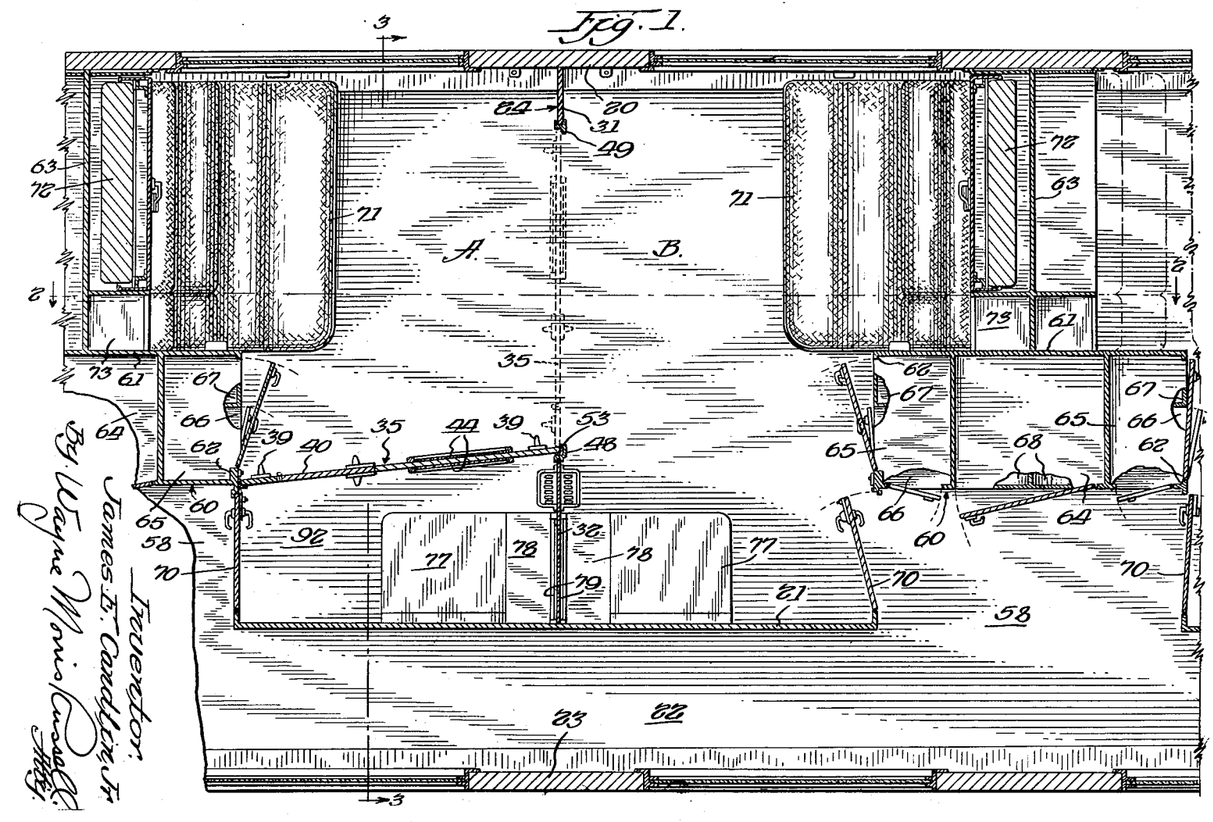
Fig. 1 is a horizontal sectional view through a portion of a railway sleeping car showing the invention applied to a pair of adjoining rooms therein.
Figures 4, 6, 7:
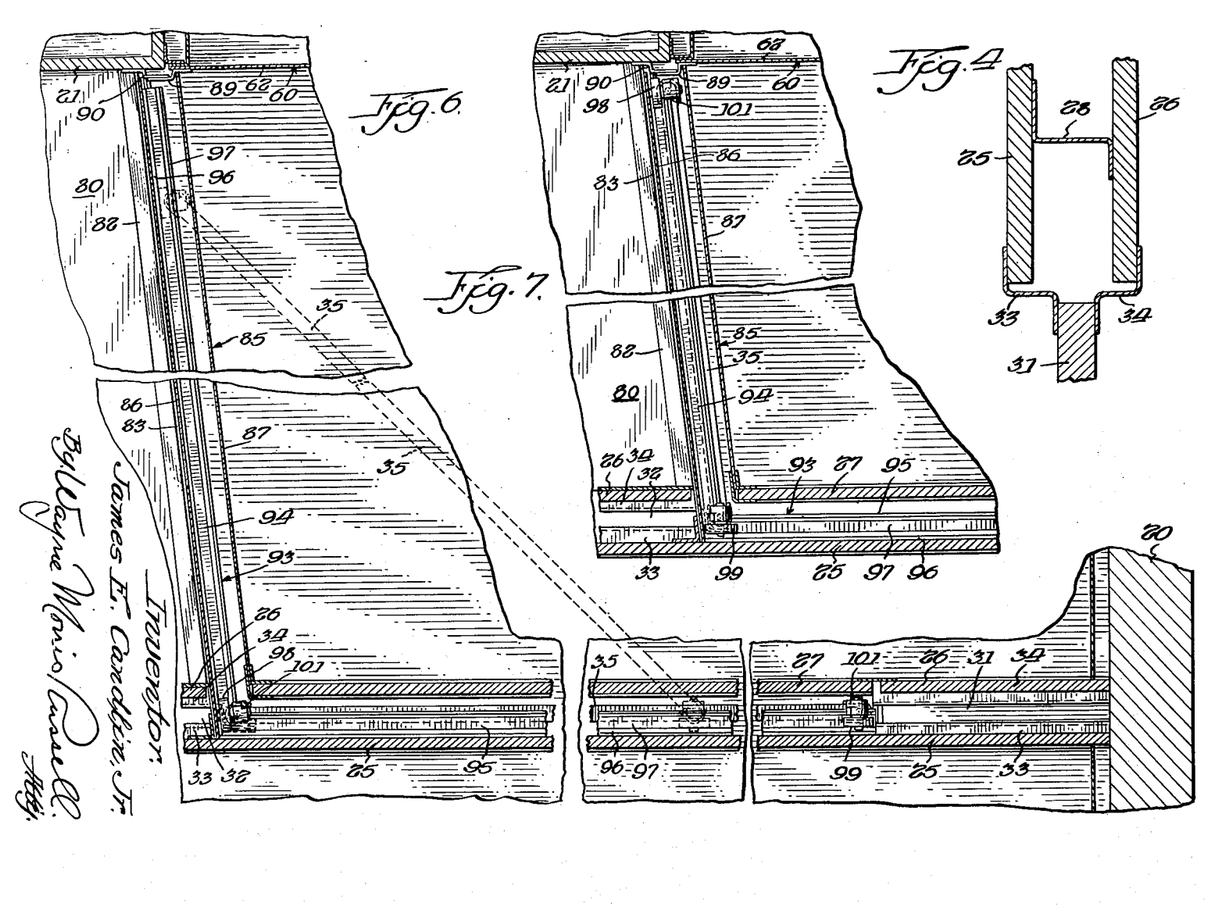
Fig. 4 is a sectional detail view taken substantially as indicated by the line 4—4 of Fig. 3.
Figs. 6 and 7 are enlarged broken views of the parts shown in Fig. 5, showing the partition member in its room-separating position by full lines in Fig. 6 and in its annex-forming position in Fig. 7, and also showing an intermediate position thereof by broken lines in Fig. 6.
Figures 5, 11:
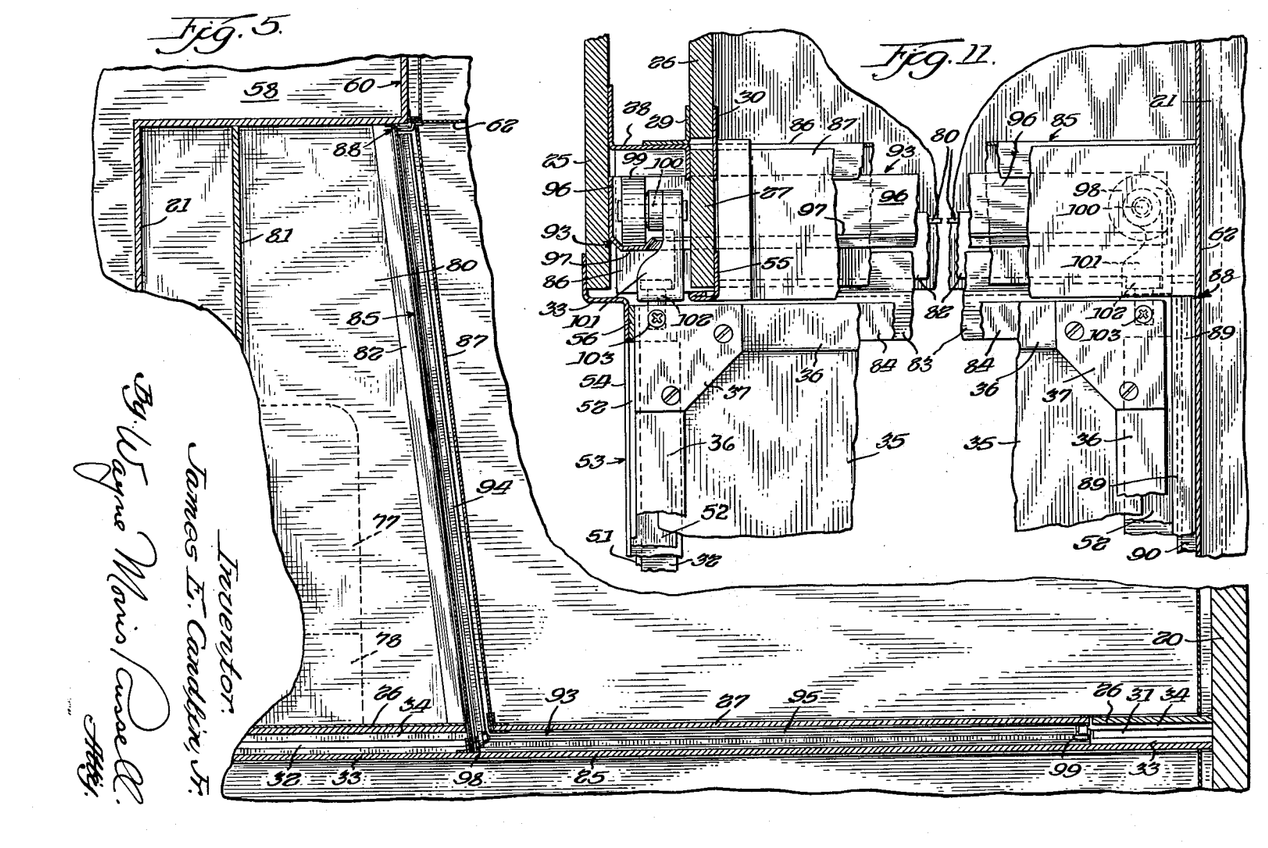
Fig. 5 is a horizontal sectional view showing the track arrangement for the movable partition member.
Fig. 11 is a detail view of the track and partition suspension as seen in Fig. 10.

Referring to the drawings, there is shown in Figs. 1 and 2 a pair of adjoining rooms A and B in a railway sleeping car or similar vehicle, each having one end defined by a side wall 20 of the car and the other by a partition 21 which defines one side of a passageway 22 extending along the rooms and having its other side defined by the other side wall 23 of the car. Between the rooms A and B is a common partition 24 serving as a side wall of each room, extending from the wall 20 to the partition 21. The upper part of the partition 24 is formed by a pair of spaced parallel partition portions 25 and 26 extending uninterruptedly the length of the partition, one of these portions, in this instance the portion 26 facing on the room A, having a part of its lower edge cut away, a removable partition piece 27 normally filling the gap (see Figs. 8 to 11). The partition portions 25 and 26 are secured in spaced relation by a Z-plate 28 and an angle member 29, as shown in Figs. 4 and 11, the plate 28 having a flange positioned to depend from the lower margin of the cutaway part of the portion 26 for engagement by one face of the removable piece 27. A suitable strip or plate 30 extends over the joint between the portion 26 and piece 27 and holds the latter in place, being secured by screws or the like. The lower part of the partition 24 is formed by fixed portions 31 and 32 extending from the wall 20 and the partition 21 respectively, in a plane between the upper portions 25 and 26, and defining an opening extending from the floor to the lower edges of the upper portions between the inner opposed edges of the lower portions. Z-plates 33 and 34 join the upper ends of the partition portions 31 and 32 to the lower edges of the portions 25 and 26, respectively, as shown in Fig. 4, the plates 33 extending the full length of the partition (Fig. 11), while the plates 34 terminate adjacent the opening.

Figures 5, 13:
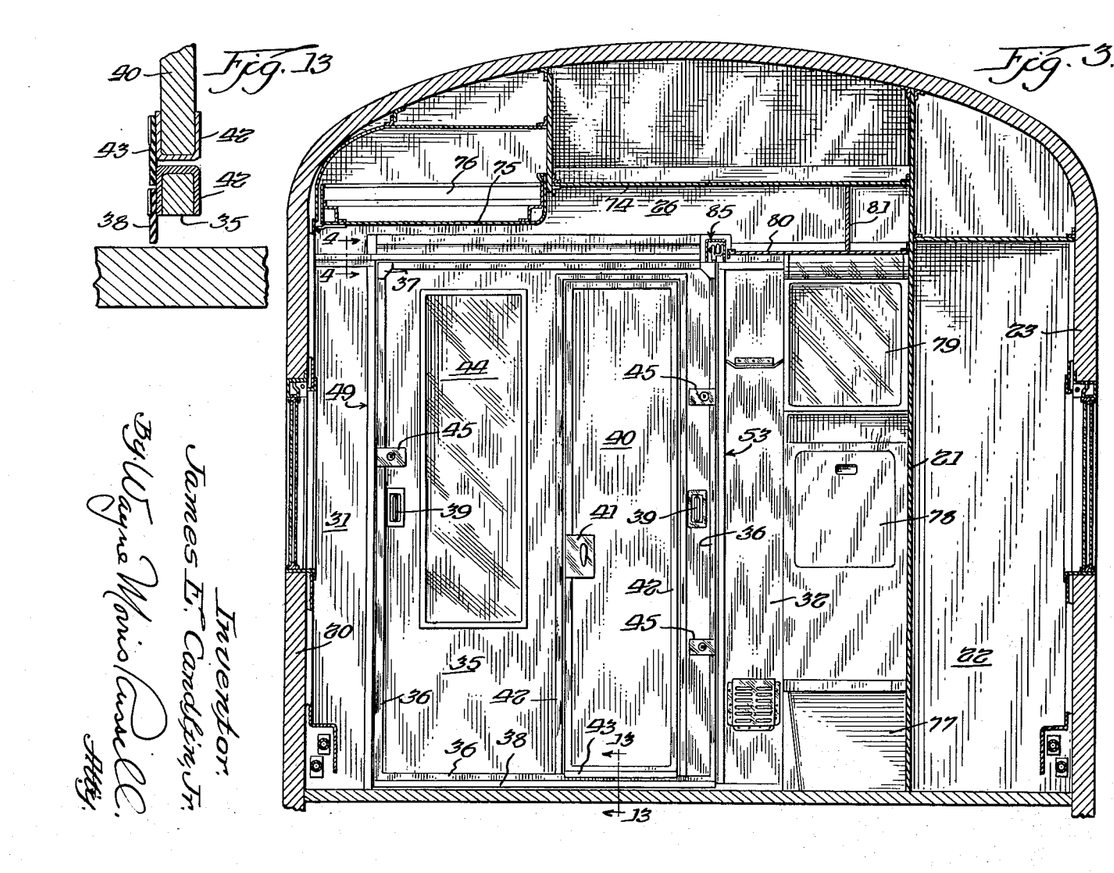
Fig. 13 is a sectional detail view taken substantially as indicated by the line 13—13 of Fig. 3.
Figure 6:
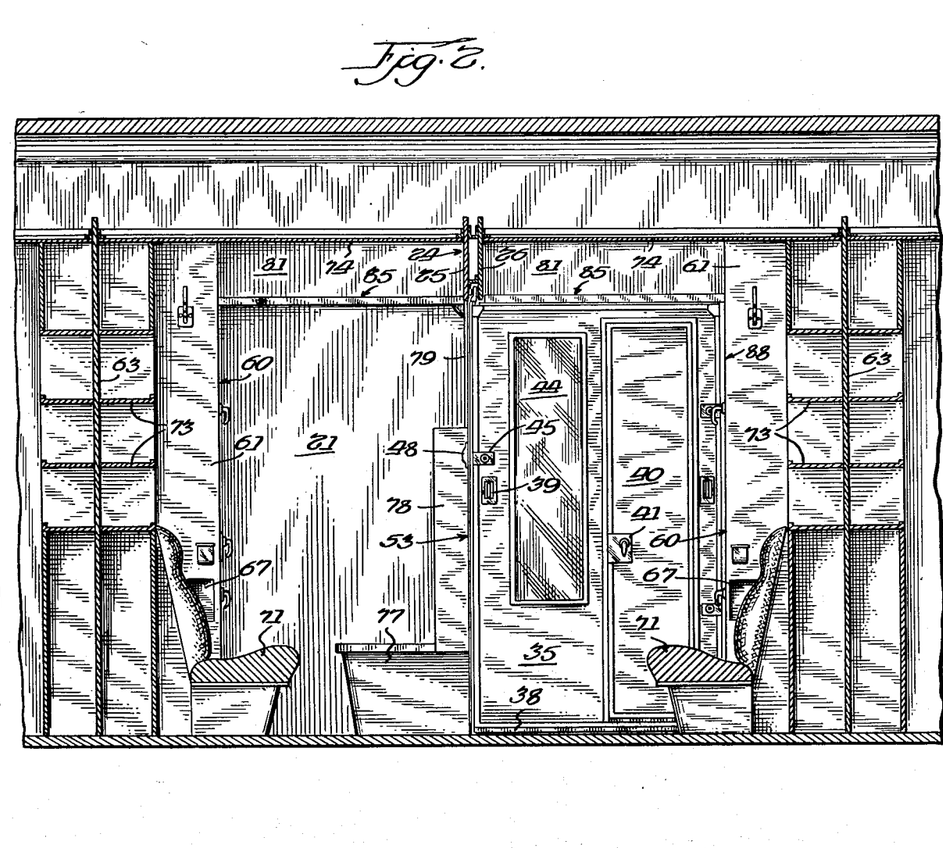
Figure 8:
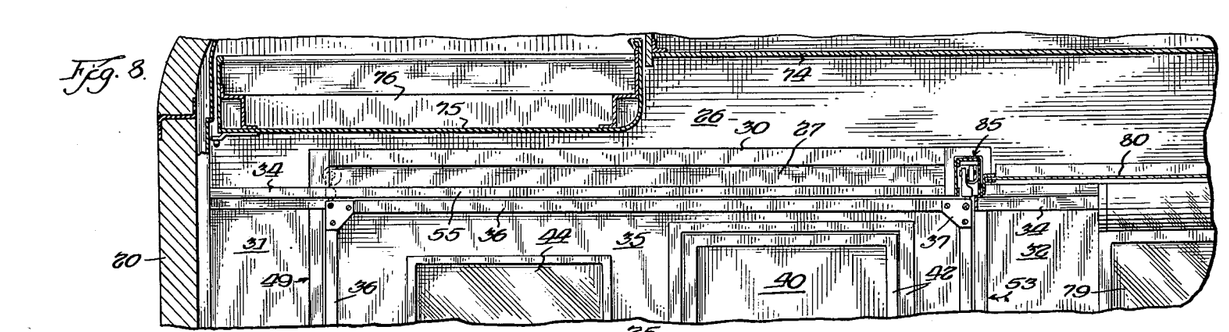
Fig. 8 is an enlarged view of the parts shown in the upper portion of Fig. 3.
Figures 12, 14:
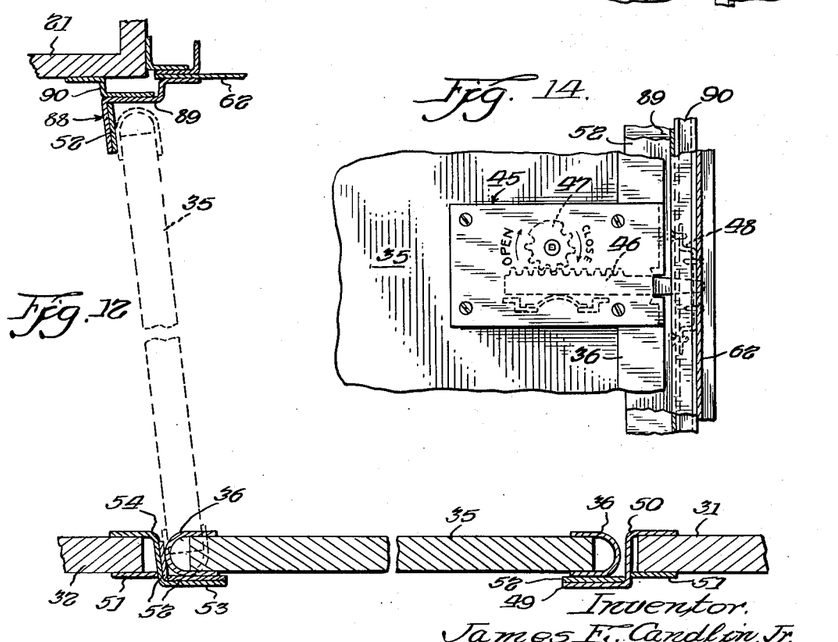
Fig. 12 is a broken horizontal sectional view similar to Fig. 5 but taken in a lower plane, showing the jambs for the partition member and illustrating the partition member in room-separating position by full lines and in annex-forming position by broken lines.
Fig. 14 is a fragmentary elevational view showing one of the partition member locking means.

The partition 24 is completed by a movable partition member 35 which is adapted to close the opening. The member 35 is in the form of a substantially rigid panel of suitable material with channel members 36 disposed over the top, bottom, and end edges thereof, and channel-form brackets 37 at the upper corners flush with the channel members 36 serving for connection of the partition member 35 to mounting means as hereinafter explained. The lower edge of the partition member is preferably spaced somewhat above the floor covering, and is provided with a flexible sealing strip 38 of rubber or the like for engagement with the floor covering. Suitable handles 39 are secured on the room A side of the partition member 35 for moving it between the full line and dotted line positions of Fig. 1, in the manner hereafter described. Adjacent its right-hand end as viewed in Figs. 2 and 3, the partition member is provided with a door opening having a door 40 mounted therein to open into room A and which may be locked from either or both sides by means of double-handled lock 41. The edges of the door opening and of the door may be defined by channel members 42, and a sealing strip 43 similar to the strip 38 may be secured on the bottom of the door, as shown in Fig. 13. Adjacent its left-hand end, the member 35 may have a mirror 44 on each side. Suitable locks 45 are provided for securing the partition member in either of its alternate positions, one of these locks being located at the left edge of the member and two being spaced along its right edge. One of these locks is illustrated in Fig. 14 as comprising essentially a rack bar 46 which serves as the locking bolt, and a cogwheel 47 which may be rotated in one or the other direction by a suitable key to project the bolt into or retract it from a suitable keeper 48. Other suitable locking means may be employed if desired.

Figure 9:
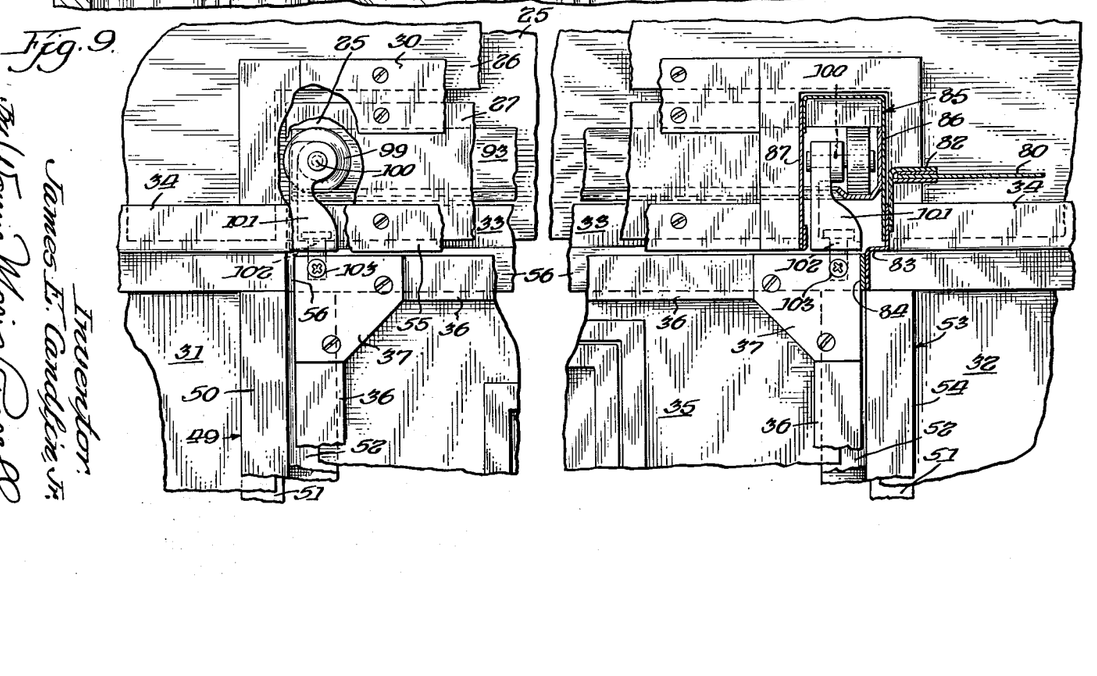
Fig. 9 is a detail view of the track and partition suspension as seen in Fig. 8.
Figure 10:
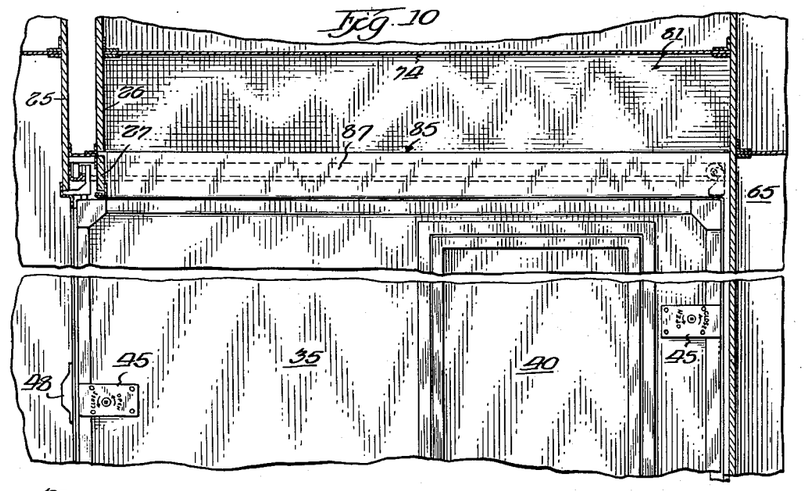
Fig. 10 is an enlarged view of the parts shown in the upper portion of Fig. 2.

As best shown in Figs. 9, 11 and 12, the edge of the lower partition portion 31 is provided with a jamb 49 formed by a Z-plate 50 having its central web part extending across the edge of portion 31 with one flange secured to the side thereof facing room A, the second flange projecting in a plane parallel to the secured flange but in the opposite direction, and on the room B side of the partition portion 31. A finishing and reinforcing strip 51 is secured on the room B side of the partition portion with an edge engaging the central web of the plate 50. A strip 52 of rubber, felt, or like material is disposed on the second flange of the Z-plate for engagement by the edge of the partition member 35. In the central web of the Z-plate 50 is a slot through which the bolt of the left-hand lock 45 may engage with a keeper recessed in the edge of portion 31. Along the edge of the other partition portion 32 is a jamb 53 similar to the jamb 49, except that its Z-plate 54 has a central web angled toward the partition 21 and opposite side of room A, and strips 52 are secured on both the central web and the projecting flange of the Z-plate. In the central web of the plate 54 is a pair of slots behind which are keepers 48 for the right-hand locks 45 of the partition member 35, and in the projecting flange of this Z-plate is a slot located to accommodate the bolt of the left-hand lock when the partition member is in the dotted line position of Fig. 12. A keeper 48 is secured on the room B face of this flange to receive the bolt projected through the slot (Figs. 2 and 10). The other keepers are mounted substantially as shown in Fig. 14. The lower edge of the removable partition piece 27 has a suitable L-shaped finishing strip 55 just above the level of the partition member 35. A strip 56 similar to the strips 52 is secured on the depending flange of the Z-plate 33, for engagement by the top edge of the partition member.

The partition 21 is formed with a plurality of offsets extending from the passageway 22 into what would otherwise be room space and providing alcoves 58 at intervals which open off the passageway and have sufficient depth to accommodate a person standing therein substantially clear of the passageway. The backs of the alcoves are provided by portions of the partition offsets extending substantially parallel to wall 20, and behind each of the alcoves is a compartment 60 defined by a back partition 61 parallel to the back of the adjacent alcove and end partitions 62 which extend between the partition 61 and the sides of the alcoves, the compartments in effect being part of the alcoves. A partition 63 extends from each back partition 61 to the vehicle wall 20, and with the partition members which provide the compartment and alcove, defines the side of the room opposite that provided by the common partition 24. As will be clear from Fig. 1, the alcoves 58 are spaced from the common partition, and each alcove and its associated compartment 60 extend on both sides of the adjacent partition 63. In the present instance, the alcoves and compartments are rectangular, but may be of other configurations. As already indicated, the alcove 58 may be considered as defined by the back partition 61 and end partitions 62 together with the transversely extending portions of the partition 21, and as divided into the compartment 60 and a recess off the passageway by what has been referred to as the back of the alcove, that is, the offset portion of partition 21 extending parallel thereto. So far as the invention is concerned, it is a matter of indifference whether the compartment is contained in the alcove or is located behind it or otherwise adjacent thereto, and the particular construction employed is determined by considerations of relative economy and facility of assembly. On the sides of the partitions 63 opposite the rooms A and B are other rooms or similar vehicle spaces. The alcoves 58 and compartments 60, or perhaps more accurately the offsets and partitions defining them, provide a relatively narrow part at the end of each room adjacent the passageway, and provide partition means in the room A for cooperation with the movable partition member 35 to define an annex therein as hereafter explained.

Each compartment 60 is divided into a centrally disposed linen locker 64 or the like, and a wardrobe 65, shoe locker 66 and shelf 67, and luggage space 68 at successively lower levels on each side thereof. The locker 64 has a door opening onto the alcove so that an attendant may have ready access to its interior while standing clear of the passageway 22, and thus may prepare the rooms for either nighttime or daytime use without any appreciable interference with traffic in the passageway. The necessary supplies for the rooms adjacent each alcove are kept conveniently at hand in the locker, saving time and labor in preparing the rooms for use. The wardrobe and other subdivisions of the compartment on each side of the locker 64 are arranged accessible only from the adjacent room, except that the shoe locker has a door opening to the alcove as well as one opening on the room, as is well known in sleeping car construction. The wardrobe also preferably is provided with a door, as shown. Each alcove has a pair of doors 70 at opposite sides thereof, each in one of the portions of the partition offset extending between the compartment 60 and passageway 22. Each of the doors 70 opens to one of the rooms adjacent the respective alcove 58, so that communication between the room and passageway is through the alcove. A person entering or leaving a room therefore may stand in the alcove so as not to impede others who may be moving along the passageway.

Each of the rooms A and B has at the wider end thereof adjacent the wall 20 a seat 71 or the like arranged to extend between the partition 61 and the wall. The backrest portion of the seat 71 is foldable and mounted in cooperative relation to a vertically disposed folding bed 72 which is adapted to be disposed horizontally extending lengthwise of the room to the partition 24 to provide a lower berth. The shelf 67 is disposed conveniently at one end of the seat, and shelves 73 may be provided above the sofa adjacent the compartment 60. The ceiling 74 of each room is spaced below the roof of the car, and may have a movable portion 75 adjacent the wall 20 containing and normally concealing an upper berth 76 which may be lowered for use by any suitable means, not shown. At the narrow end part of each room, on opposite sides of the lower partition portion 32, toilet facilities are provided, such as a hopper 77, a folding washstand 78, a mirror 79, and such additional items as may be desired. The partition portion 32 preferably extends inwardly between the rooms to a point somewhat beyond the toilet facilities. The room door 70 is opposite the portion 32 and is arranged to swing clear of the toilet facilities. A plate-like member 80 is disposed over the narrow end part of each room, at approximately the level of the removable partition piece 27, extending from above the room door 70 to the partition portion 32 and from the partition 21 to the plane which extends from the edge of portion 32 to the partition means defining the alcove 58 and compartment 60, in this instance to the edge of the end partition 62 adjacent the room door. The plate member 80 is spaced below the ceiling 74, and although it may be formed as a depressed portion thereof, is preferably a separate part which may serve as a luggage or package shelf as well as the ceiling for the annex hereinafter described. To hold the depth of the shelf to a convenient limit, a vertical partition element 81 is provided extending between the ceiling 74 and plate member 80 in spaced relation to the partition 21. As best shown in Fig. 9, the edge of the plate member extending from the partition portion 32 to the partition 62 is supported by an angle member 82 extending similarly and secured to the partitions. The other edges of the plate member may be supported by suitable angle members secured to the adjacent partitions. The angle member 82 has a depending flange to which is secured an upstanding flange of a Z-plate 83 similar to and extending from the Z-plate 34 which joins the partition portions 26 and 32 as previously described. The Z-plate 83 has its lower flange extending as a continuation of the lower flanges of Z-plates 33 and 34, and a strip 84 similar to the strips 52 and 56, and serving as a continuation of the latter, is secured on this flange of the plate 83. A nosing 85 of inverted channel form is provided at the edge of the plate member 80, projecting above and serving as a retaining lip for the shelf afforded by the member. The nosing is formed by an angle member 86 with a vertically disposed flange secured to the upstanding flange of Z-plate 83 and a horizontal flange extending from the upper edge of the vertical flange outwardly of the plate member 80 and having a depending lip to which is secured a removable plate 87 corresponding substantially to the removable partition piece 27. The removable plate 87 has one end in engagement with the piece 27, or adjacent thereto, and the other end disposed adjacent the partition 62. A jamb 88 is provided at the partition 62 in the vertical plane of the edge portion of plate member 80. The jamb 88 is similar to the jambs 49 and 53, but differing slightly therefrom, as may best be understood by reference to Figs. 11, 12, and 14. As there shown, the jamb 88 is formed by an angle member 89 one flange of which is spaced from the offset of partition 21 by a suitable Z-plate 90 and has an offset part secured to the partition 62, the other flange of the angle member extending substantially in the plane of the central web part of the Z-plate 54 of jamb 53 and having a strip 52 thereon similar to the strips 52 of the other jambs. The angle member 89 and Z-plate 90 are appropriately slotted for reception of the bolts of the right-hand locks 45 of the partition member 35 in keepers 48 recessed in the adjacent partition, as shown in Fig. 14. The distance between the jambs 53 and 88, or in other words the width of the narrow end part of room A taken in the plane of the edge of plate member 80, is substantially equal to the width of the opening of the common partition 24, so that the partition member 35 may extend completely thereacross. When the partition member is disposed in this position across the narrow end part of the room, an annex 92 (Fig. 1) is defined by the partition member, the partition portion 32, and the partition 21 and its offset in which the room door 70 is located. The luggage shelf 80 provides a ceiling for the annex, which is thus completely closed off from the remainder of room A to afford complete privacy when the toilet facilities are used. The room door 70 comprises the major part of one end of the annex, and of course is locked, passage to and from the annex being had through the door 40 in the partition member 35. When the partition member is in the annex-forming position, the opening in the common partition 24 is of course unobstructed, the rooms A and B being disposed en suite for use as a combined unit, and the door 70 of room B is used for both rooms.

To provide for shifting the partition member 35 between its room-separating position in the common partition 24 and its annex-forming position extending across the narrow room end part, a track 93 is secured slightly above the level of the top of the partition member. As best shown in Figs. 6, 7, 9, and 11, the track 93 has one portion 94 disposed within the nosing 85 and extending along the edge of the shelf member 80, and another portion 95, at an angle to the portion 94, disposed between the upper partition portion 25 and the removable partition piece 27 and extending across the opening in the common partition 24. The two portions of track 93 are joined with a mitered fit at the edge of the partition portion 32. The track is substantially an angle member with one flange 96 extending vertically and secured to the upper partition portion 25 and the vertical flange of the angle member 86 of the nosing 85, and the other flange 97 extending horizontally toward the room A from the lower edge of the flange 96 and being shaped to a shallow channel form for receiving suitable track followers. These followers in this instance are in the form of a pair of rollers mounted to travel on the channeled flange 97 of the track. One roller 98 is arranged to travel on the track portion 94 and the other roller 99 is arranged to run on the other track portion 95. Each roller is mounted on a horizontal axle 100 which projects beyond the edge of the flange 97 and has secured thereon a pivot bracket 101. The bracket depends from the axle below the level of the track, and has a horizontal portion at its lower end through which a pivot pin 102 projects into one of the corner brackets 37 of the partition member 35, in which it is secured by a suitable screw 103 or the like. The partition member is thus suspended below the track 93 and arranged to pivot about either or both of two vertical axes passing through the pivot pins 102, and the rollers are at all times spaced apart by substantially the length of the partition member. In movement of the partition member from one position to the other, the roller 98 moves only on the track portion 94, and the roller 99 only on track portion 95.

The movement of the partition member 35 between its alternate positions is made clear by Figs. 6 and 7. In Fig. 6, the partition member is shown in its room-separating position by full lines, the roller 99 being at the end of the track portion 95 adjacent the edge of the lower partition portion 31, and the roller 98 at the angle or corner of the track portions adjacent the edge of the lower partition portion 32. The partition member is held in this position by the locks 45, the bolts of which are projected into the respective keepers 48 mounted behind the jambs 49 and 53, and the door 40 in the partition member is locked, so that access to one room from the other is effectively prevented. In addition, the engagement of the edge channels 36 of the partition member against the strips 52 and 56, and the provision of the sealing strips 38 and 43, substantially prevents passage of light or air currents between the rooms and deadens sounds. The locks and strips also prevent rattling of the partition member. To move the partition member 35 from this position, shown in dotted lines in Fig. 1 and also shown in Fig. 3, to the annex-forming position illustrated in Fig. 7, shown in full lines in Fig. 1 and also shown in Fig. 2, the locks 45 are released and the handles 39 are grasped to swing the partition member so as to move the roller 98 on the track portion 94 to the end thereof adjacent the partition 62, and also move the roller 99 on the track portion 95 to the junction of the track portions, the partition member swiveling relative to the rollers about the pins 102. The latter positions of the rollers are shown in Fig. 7. An intermediate position of the partition member and rollers in the movement thereof is indicated by dotted lines in Fig. 6. The partition member is secured in the annex-forming position by the locks 45 in the same manner as in its room-separating position, the bolts being engaged in the keepers 48 associated with the jamb 88 and the keeper 48 mounted on the flange of the Z-plate 54 of jamb 53. The edge channels 36 of the partition member engage the strips 52 of the jambs and the strip 84 on Z-plate 83 below the nosing 85. The room door 70 is locked, and the door 40 is unlocked at least on the side facing the annex 92 so that the annex may be entered when desired. With the partition member in the annex-forming position, the rooms A and B are arranged en suite for entry or exit through the room door 70 of room B, as previously mentioned. The partition member 35 is moved to the room-separating position by reversing the operation just described for shifting it to the annex-forming position.

The removable piece 27 and the removable plate 87 provide for easy assembly of the parts and for repair or replacement of worn parts with a minimum of difficulty, and thus add to the practicability and utility of the invention without detracting from the appearance of the structure. Closing pieces or plates of suitable form are provided at the ends of the cutaway part of the upper partition portion 26, as shown for example in Fig. 9, to cover the joints between the removable piece and the partition and between the removable plate and the removable piece, but need not be described in detail.

Although the annex 92 has been described as formed in the room A, it will be obvious that if desired the movable partition member 35 may be so mounted as to be shiftable for positioning across room B instead, or the arrangement may be such that an annex may be formed in either room. For all practical purposes, however, it is sufficient that one of the rooms be arranged for the provision of an annex. In this connection, it is evident that the alcove 58 and compartment 69 provide partition means in the room for cooperation with the movable partition member in providing the annex, but that other partition means may be employed for this purpose if desired, or in cases where the proportions of the room permit, the partition member may be arranged to extend across the room to form an annex without the use of any partition means to lessen the space which the partition member must span.

What is claimed is:

1. In a vehicle, a pair of adjoining rooms each defined by a common side wall, another side wall, end walls of which at least one connects the side walls, at least one of the rooms having partition means extending between the other end wall thereof and said other side wall thereof to define a relatively narrow end portion of the room adjacent said other end wall, a plate member extending over said narrow room end portion having an inner edge portion spaced from said other end wall and being spaced below the room ceiling level, an opening in the common side wall located with a side thereof adjacent said edge portion of the plate member and having a width corresponding to the length of said edge portion, a movable partition of a length corresponding to the length of said edge portion, a generally horizontal track member having a portion disposed along said edge portion and another portion disposed over the opening, a pair of track followers on the partition each engaged with one of the track member portions and movable therealong for shifting the partition between a position extending across the opening to separate the rooms and a position extending across the narrow room end portion along said plate member edge portion to define the room end portion as an annex and simultaneously arrange the rooms en suite, a door in the partition affording passage to and from the annex in the last-mentioned position of the partition, and a door in the other of said rooms allowing passage to and from both rooms in the en suite relation thereof.

2. In a vehicle, a pair of adjoining rooms each defined by a common side wall, another side wall, end walls of which at least one connects the side walls, at least one of the rooms having partition means extending between the other end wall thereof and said other side wall thereof to define a relatively narrow end portion of the room adjacent said other end wall, a plate member extending over said narrow room end portion having an inner edge portion spaced from said other end wall and being spaced below the room ceiling level, an opening in the common side wall located with a side thereof adjacent said edge portion of the plate member and having a width corresponding to the length of said edge portion, a movable partition of a length corresponding to the length of said edge portion, a generally horizontal track member having a portion disposed along said edge portion and another portion disposed over the opening, a pair of track followers on the partition each engaged with one of the track member portions and movable therealong for shifting the partition between a position extending across the opening to separate the rooms and a position extending across the narrow room end portion along said plate member edge portion to define the room end portion as an annex and simultaneously arrange the rooms en suite, and a door in the partition affording passage to and from the annex in the last-mentioned position of the partition.

3. In a vehicle, a pair of adjoining rooms each defined by a common side wall, another side wall, end walls of which at least one connects the side walls, at least one of the rooms having partition means extending between the other end wall thereof and said other side wall thereof to define a relatively narrow end portion of the room adjacent said other end wall, a plate member extending over said narrow room end portion having an inner edge portion spaced from said other end wall and being spaced below the room ceiling level, an opening in the common side wall located with a side thereof adjacent said edge portion of the plate member and having a width corresponding to the length of said edge portion, a movable partition of a length corresponding to the length of said edge portion, a generally horizontal track member having a portion disposed along said edge portion and another portion disposed over the opening, and a pair of track followers on the partition each engaged with one of the track member portions and movable therealong for shifting the partition between a position extending across the opening to separate the rooms and a position extending across the narrow room end portion along said plate member edge portion to separate the room end portion from the room as an annex and simultaneously arrange the rooms en suite.

4. In a vehicle, a pair of adjoining rooms each defined by a common side wall, another side wall, and end walls disposed between the side walls, at least one of the rooms having said other side wall thereof shorter than the common wall and one of the end walls shorter than the other end wall and also having partition means connecting the shorter walls to define a relatively narrow end portion of the room adjacent the shorter end wall, an opening in the common side wall spaced from said shorter end wall and having a width corresponding to the width of said narrow room end portion, a movable partition of a length corresponding to the width of the opening, a generally horizontal track having a portion along the common side wall extending across the opening and another portion extending from the common side wall adjacent the opening to the partition means, a pair of track followers on the partition each engaged with one of the track portions and shiftable therealong for moving the partition between a position extending across the opening to separate the rooms and a position extending across the narrow room end portion to provide an annex and simultaneously dispose the rooms en suite, a door in the partition affording passage to and from the annex in the last-mentioned position of the partition, and a door in the other of said rooms allowing passage to and from both rooms in the en suite relation thereof.

5. In a vehicle, a pair of adjoining rooms each defined by a common side wall, another side wall, end walls of which at least one connects the side walls, at least one of the rooms having partition means extending between the other end wall thereof and said other side wall thereof to define a relatively narrow end portion of the room adjacent said other end wall, an opening in the common side wall spaced from said other end wall and having a width corresponding to the width of said narrow room end portion, a movable partition of a length corresponding to the width of the room end portion, a generally horizontal track member having a portion disposed across the opening and another portion extending across the room end portion from the partition means to the common side wall, a pair of track followers on the partition each engaging with one of the track member portions and shiftable therealong for moving the partition between a position extending across the opening to separate the rooms and a position extending across the narrow room end portion to separate said room end portion from the remainder of the room as an annex, and a door in the partition affording passage to and from the annex in the last-mentioned position of the partition.

6. In a vehicle, a pair of adjoining rooms each defined by a common side wall and another side wall and end walls of which at least one connects the side walls, at least one of the rooms having partition means extending between said other side wall thereof and the other end wall thereof to define a relatively narrow end portion of the room adjacent the shorter end wall, an opening in the common side wall spaced from the shorter end wall and having a width substantially equal to the width of said narrow room end portion, a movable partition of a length substantially equal to the width of the opening, a generally horizontal track having a portion extending across the opening and another portion extending between the common side wall and the partition means, and a pair of track followers on the movable partition each engaged with one of the track portions and shiftable therealong for moving the partition between a position extending across the opening to separate the rooms and a position extending across the narrow room end portion to provide an annex and simultaneously to dispose the rooms en suite.

7. In a vehicle, a pair of adjoining rooms each defined by a pair of side walls and a pair of end walls, one of the side walls of each room being common to the other room, at least one of the rooms having partition means extending partially thereacross from the other of said side walls in spaced relation to the plane of one of the end walls, a plate member covering the part of the room defined between said one end wall and the plane of said partition means and spaced below the room ceiling level, an opening in the common side wall located with one side thereof adjacent said plane and having a width corresponding to the distance between the common wall and the partition means, a movable partition of a length corresponding to the width of the opening, a track member having angularly related portions each extending from adjacent said one side of the opening with one disposed across the opening and another disposed extending between the common wall and the partition means, a pair of track followers on the partition each engaging with one of the track member portions and movable therealong for shifting the partition between a position extending across the opening to separate the rooms and a position extending between the common wall and the partition means along said plate member to separate the covered room part from the remainder of the room as an annex and simultaneously to arrange the rooms en suite, and a door in the partition allowing passage to and from the annex in the last-mentioned position of the partition.

8. In a vehicle, a pair of adjoining rooms each defined by a pair of side walls and a pair of end walls, one of the side walls of each room being common to the other room, at least one of the rooms having partition means extending partially thereacross from the other of said side walls in spaced relation to the plane of one of the end walls, an opening in the common side wall spaced from said one end wall and having a width corresponding to the distance between the partition means and the common wall, a movable partition of a length corresponding to the width of the opening, a track member having angularly related portions of which one extends across the opening and the other extends between the common wall and the partition means, a pair of track followers on the partition each engaging with one of the track member portions and movable therealong for shifting the partition between a position extending across the opening to separate the rooms and a position extending between the common wall and the partition means to separate a part of the one room from the remainder thereof as an annex and simultaneously to arrange the rooms en suite, and a door in the partition allowing passage to and from the annex in the last-mentioned position of the partition.

9. In a vehicle, a pair of adjoining rooms having a common side wall and each also having another side wall and end walls connecting the side walls, at least one of the rooms having a generally horizontal plate member spaced below the ceiling extending from side wall to side wall and from one of the end walls to a vertical plane between the end walls and presenting an edge portion in said plane, an opening in the common side wall of a width corresponding to the length of said edge portion and located with a side thereof adjacent said plane, a generally horizontal track having a portion extending across said one room along said edge portion of the plate member and another portion extending over the opening, a pair of rollers each mounted to travel on one of the track portions, a substantially rigid partition of a length corresponding to the length of said edge portion carried by the rollers in swiveled relation thereto, the partition by movement of the rollers on the track portions being shiftable between a position closing the opening and a position extending across said one room along said plane to provide an enclosed annex and simultaneously to arrange the rooms en suite, a door in the partition to allow passage to and from the annex in the last-mentioned position of the partition, and a door in the other of the rooms to allow passage to and from both rooms in the en suite arrangement thereof.

10. In a vehicle, a pair of adjoining rooms having a common side wall and each also having another side wall and end walls connecting the side walls, at least one of the rooms having a generally horizontal plate member disposed thereacross at one end extending from the adjacent end wall to a vertical plane between the end walls and presenting an edge portion in said plane and spaced below the room ceiling level, an opening in the common side wall of a width corresponding to the length of said edge portion and located with a side thereof adjacent said plane, a track having a portion extending along the common wall across the opening and another portion extending across said one room along said plane, a pair of track followers each mounted to travel on one of the track portions, a substantially rigid partition of a length corresponding to the length of said edge portion carried by the track followers, the partition by movement of the followers on the track portions being shiftable between a position along the common wall closing the opening and a position extending across said one room along said plane closing off the portion of the room below the plate member to provide an annex and simultaneously disposing the rooms en suite, and a door in the partition to allow passage to and from the annex in the last-mentioned position of the partition.

11. In a vehicle, a pair of adjoining rooms having a common side wall and each also having another side wall and end walls connecting the side walls, an opening in the common side wall having a width corresponding to the distance between the common side wall and the other side wall of one of the rooms in a plane spaced from one of the end walls, said opening being located with a side thereof adjacent said plane, a track member having a portion extending across the opening and another portion extending across the space between the common side wall and said other side wall along said plane, a substantially rigid partition of a length corresponding to the width of the opening, a pair of track followers on the partition each mounted on one of the track member portions for travel thereon to shift the partition between a position extending across the opening to separate the rooms and a position extending across said one room between the common wall and said other side wall along said plane to divide a part of the room from the remainder as an annex and simultaneously to place the rooms en suite, and a door in the partition to allow passage to and from the annex in the last-mentioned position of the partition.

12. In a vehicle, a pair of adjoining rooms, a passageway separated from the rooms by a common wall having offset portions defining an alcove opening off the passageway, means dividing the alcove into a storage compartment and a recess off the passageway of sufficient depth to accommodate a person substantially clear of the passageway, means affording access to the compartment from the recess, a door affording passage between the recess and one of the rooms, an opening between the rooms, and a partition movably mounted for selective shifting between a position extending across the opening and a position extending across a portion of the other of said rooms to provide a completely enclosed annex therein and simultaneously to arrange the rooms en suite.

13. In a vehicle, a pair of adjoining rooms having a common side wall and each also having another side wall and end walls extending between the side walls, an opening in the common side wall having a width corresponding to the distance between the common side wall and said other side wall of one of the rooms in a plane spaced from one of the end walls, said opening being located with a side thereof adjacent said plane, a movable partition of a length corresponding to the width of the opening, means for supporting the partition in a position along the common side wall closing the opening and in another position between the side walls of said one room along said plane to divide a part of the room therefrom as an annex and simultaneously to arrange the rooms en suite, and means mounting the partition on the supporting means for movement thereon between said positions.

14. In a vehicle, a pair of adjoining rooms having a common side wall and each also having another side wall and end walls extending between the side walls, toilet facilities in one of the rooms adjacent one end wall thereof, an opening in the common side wall located with one side thereof adjacent a plane extending transversely of said one room between the toilet facilities and the other end wall of the room, said opening having a width corresponding to the distance in said plane between the side walls of the room, a movable partition of a length corresponding to the width of the opening, means for supporting the partition in a position extending along the common side wall to close the opening and in another position extending across the room substantially in said plane to provide an annex enclosing the toilet facilities and simultaneously to arrange the rooms en suite.

15. In a vehicle, a passageway having a wall generally parallel to a wall of the vehicle with offsets therein defining spaced alcoves opening off the passageway, each alcove comprising a recess of sufficient size to accommodate a person substantially clear of the passageway and at least one of the alcoves additionally comprising a compartment with means affording access thereto from the recess, a plurality of serially arranged rooms each extending between said vehicle wall and passageway wall divided from each other by alternate long and short generally parallel partitions, each long partition extending from the vehicle wall to the passageway wall and each short partition extending from the vehicle wall to an alcove-defining offset, each room having at its end adjacent the passageway wall a narrow part defined between an alcove and a long partition, a door for each room disposed in one of said passageway wall offsets affording passage between the room and the adjacent recess, said plurality of rooms including a pair of adjoining rooms having a common partition, an opening in the common partition, a movable partition member of a length at least equal to the width of the opening and to the width of the narrow end portion of one of the pair of rooms, means mounting the partition member for shifting between a position closing the opening and a position extending across the narrow end portion of said one room to provide an annex, and a door in the partition member affording passage to and from the annex in the last-mentioned position of the partition member.

16. In a vehicle, a passageway having a wall generally parallel to a wall of the vehicle with offsets therein defining spaced alcoves opening off the passageway, each alcove comprising a recess of sufficient size to accommodate a person substantially clear of the passageway and at least one of the alcoves additionally comprising a compartment with means affording access thereto from the recess, a plurality of serially arranged rooms each extending between said vehicle wall and passageway wall divided from each other by alternate long and short generally parallel partitions, each long partition extending from the vehicle wall to the passageway wall and each short partition extending from the vehicle wall to an alcove-defining offset of the passageway wall, each room having at its end adjacent the passageway wall a narrow part defined between an alcove and a long partition, a door for each room disposed in one of the passageway wall offsets affording passage between the room and the adjacent recess, said plurality of rooms including a pair of adjoining rooms having one of said partitions as a common partition, an opening in the common partition, a movable partition member of a length at least equal to the width of the opening and to the width of the narrow end part of one of the pair of rooms, and means mounting the partition member for shifting between a position closing the opening and a position extending across the narrow end portion of said one room to provide an annex and simultaneously place the pair of rooms en suite.

17. In a vehicle, a passageway having a wall generally parallel to a wall of the vehicle with offsets therein defining spaced alcoves opening off the passageway each of sufficient size to accommodate a person substantially clear of the passageway, a plurality of serially arranged rooms each extending between said vehicle wall and passageway wall divided from each other by alternate long and short generally parallel partitions, each long partition extending from the vehicle wall to the passageway wall and each short partition extending from the vehicle wall to an alcove-defining offset of the passageway wall, each room having at its end adjacent the passageway wall a narrow part defined between an alcove and a long partition, a door for each room disposed in one of the passageway wall offsets affording passage between the room and the adjacent alcove, said plurality of rooms including a pair of adjoining rooms having one of said partitions as a common partition, an opening in the common partition, a movable partition member of a length at least equal to the width of the opening and to the width of the narrow end part of one of said pair of rooms, means mounting the partition member for shifting between a position closing the opening to separate the pair of rooms and a position extending across the narrow end part of said one room to provide an annex and simultaneously arrange the pair of rooms en suite, and a door in the partition member for passage to and from the annex in the last-mentioned position of the partition member.

18. In a vehicle, a pair of adjoining rooms, a passageway separated from the rooms by a common wall having an offset providing an alcove off the passageway and a corresponding narrow part at the adjacent end of one of the rooms, a compartment in the alcove occupying only a portion of the space thereof and leaving a recess off the passageway of sufficient size to accommodate a person substantially clear of the passageway, means affording access to the compartment from the recess, a door in the offset to allow passage between said one room and the recess, a door affording passage between the other room and the passageway, an opening between the rooms, a movable partition of a length at least equal to the width of the opening and to the width of said narrow end part of the one room, and means mounting the partition for movement between a position closing the opening and a position extending across said narrow end part from adjacent the opening to the offset to provide an annex.

19. In a vehicle, a pair of adjoining rooms, a passageway separated from the rooms by a common wall having an offset providing an alcove opening off the passageway of sufficient size to accommodate a person substantially clear of the passageway, said offset also providing a narrow part in one of the rooms at the end thereof adjacent the wall, a door in the other room affording access to the passageway, an opening between the rooms, a movable partition of a length at least equal to the width of the opening and also to the width of the narrow end portion of said one room, means mounting the partition for movement between a position closing the opening and a position extending across said narrow end part from adjacent the opening to the offset in spaced relation to said wall for providing an annex, and a door in the partition to allow passage between the rooms and annex in the last-mentioned position of the partition.

20. In a vehicle, a pair of adjoining rooms, a passageway separated from the rooms by a common wall having an offset providing an alcove off the passageway of sufficient size to accommodate a person substantially clear of the passageway, said offset also providing a narrow part in one of the rooms at the end thereof adjacent the wall, a door in the other room affording passage to the passageway, an opening between the rooms, a movable partition of a length at least equal to the width of the opening and to the width of the narrow end part of said one room, and means mounting the partition for movement between a position closing the opening and a position extending across said narrow end part from adjacent the opening to the offset in spaced relation to said wall to provide an annex for the rooms.

21. In a vehicle, a passageway, a pair of adjoining rooms each having a dimension parallel to the passageway of substantially the length of a bed and separated from the passageway by a common wall having an offset providing an alcove adjacent both rooms opening off the passageway, a compartment in the alcove occupying only a portion thereof and spaced from the passageway a sufficient distance to allow accommodation of a person in the alcove substantially clear of the passageway, means affording access to the compartment from the alcove, and a pair of doors each disposed in the offset clear of the compartment between one of the rooms and the alcove to provide for passage between each room and the alcove.

22. In a vehicle, a passageway, a plurality of serially arranged rooms extending along the passageway each having a dimension parallel to the passageway of substantially the length of a bed and separated therefrom by a common wall having offsets providing spaced alcoves opening off the passageway each located adjacent a pair of adjoining rooms, each alcove comprising a compartment and a recess off the passageway of sufficient size to accommodate a person substantially clear of the passageway, means affording access to the compartment from the recess, and a door in each room opening to a recess for passage between the room and recess.

23. In a vehicle, a passageway and a room separated by a wall having an offset providing adjacent the room an alcove opening off the passageway, said room having a dimension parallel to the passageway of substantially the length of a bed and said alcove having a dimension transverse of the passageway smaller than the corresponding dimension of the room, means dividing the alcove into a compartment and a recess off the passageway and adjacent the room of sufficient size to accommodate a person substantially clear of the passageway, means affording access to the compartment from the recess, and a door mounted in said wall offset to allow passage between the room and recess.

References Cited in the file of this patent

UNITED STATES PATENTS

| Number | Name | Date |
|---|---|---|
| 2,232,263 | Patton | Feb. 18, 1941 |
| 2,548,851 | Watter | Apr. 10, 1951 |